(12) United States Patent
Sakai

(10) Patent No.: US 6,318,292 B1
(45) Date of Patent: Nov. 20, 2001

(54) CLEAN WATER SYSTEM AND STRUCTURE OF THE SYSTEM

(76) Inventor: Toshio Sakai, 142-2, Hatta, Isawa-cho, Higashiyashiro-gun, Yamanashi-ken 406-0023 (JP)

(*) Notice: Subject to any disclaimer, the term of this patent is extended or adjusted under 35 U.S.C. 154(b) by 0 days.

(21) Appl. No.: 09/202,211
(22) PCT Filed: Oct. 14, 1998
(86) PCT No.: PCT/JP98/04635
§ 371 Date: Dec. 10, 1998
§ 102(e) Date: Dec. 10, 1998
(87) PCT Pub. No.: WO00/06504
PCT Pub. Date: Feb. 10, 2000

(30) Foreign Application Priority Data

Jul. 29, 1998 (JP) .................................................. 10-214011

(51) Int. Cl.[7] .................................................. A01K 63/00
(52) U.S. Cl. .......................................... 119/227; 119/226
(58) Field of Search .................................... 119/225, 226, 119/227, 228, 229

(56) References Cited

U.S. PATENT DOCUMENTS

| | | | |
|---|---|---|---|
| 3,122,126 | * 2/1964 | Yamada | 119/226 X |
| 4,169,050 | * 9/1979 | Serfling et al. | 119/228 X |
| 4,522,151 | * 6/1985 | Arbisi et al. | 119/228 X |
| 5,189,981 | * 3/1993 | Ewald, Jr. | 119/225 |
| 5,560,318 | * 10/1996 | Yoshida et al. | 119/227 X |
| 6,041,738 | * 3/2000 | Hermauer et al. | 119/227 X |

FOREIGN PATENT DOCUMENTS

| | | |
|---|---|---|
| 49-29517 | 8/1974 | (JP) . |
| 62-204814 | 9/1987 | (JP) . |
| 2736517 | 1/1998 | (JP) . |

* cited by examiner

Primary Examiner—Robert P. Swiatek
(74) Attorney, Agent, or Firm—Pollock, Vande Sande & Amernick

(57) ABSTRACT

A clean water system and structure that positively utilize the natural water purification system present in rivers, the ocean and other natural water bodies to prevent water fouling and stench over the long term and enable low-cost maintenance of ponds and the like. An underwater pump (2) is installed at one end of a pond (1) and an outlet (3) that discharges water pumped by the underwater pump (2) at the other end of the pond, a sand layer (4) is spread to a prescribed depth on a bottom (10) of the pond, and carp or other swimming fish (5) are allowed to swim in the water and agitate the sand layer as secondary consumers in the food chain. Negative pressure produced at an inlet (20) of the underwater pump (2) sucks water into the inlet (20) to produce movement of water in the pond such as causes water immediately under the outlet (3) to migrate toward the inlet (20). Thus a clean water system and structure are constituted wherein the water is kept in motion to constantly supply oxygen to the entire pond (1) and prevent stagnation, thereby creating an environment in which the food-chain effect can easily operate, and the water is purified by the food-chain phenomenon among the organisms living in the pond (1).

17 Claims, 6 Drawing Sheets

CLEAN WATER SYSTEM AND STRUCTURE OF THE SYSTEM

TECHNICAL FIELD

This invention relates to a clean water system for purifying water of ponds, water tanks, streams and the like and to a structure of the system.

BACKGROUND TECHNOLOGY

Artificial ponds inhabited by fishes and other aquatic life are a frequent feature of parks, golf courses and other public facilities, while some private homes also have ornamental ponds with carp, goldfish or the like. The matter excreted and secreted by the fishes and the uneaten portion of the fish food supplied to the pond deplete the oxygen content of the water and promote proliferation of various pathogenic fungi and bacteria, producing an unhealthy environment for the fishes. Various systems have been developed for purifying such pond water using physical (mechanical) means such as filters, chemical processes, or both.

JP-A-62-204814, for instance, discloses a purifier using only physical means, i.e., a filter, while JP-B-49-29517 discloses a pond system that combines physical and chemical means.

All such conventional pond water purification technologies are, however, deficient in the point of not adequately utilizing the purification system of the natural environment described in the following.

The system of JP-A-62-204814 constantly operates a suction pump so as to deposit foreign matter in the water in a filter layer consisting of gravel or the like. The water is further passed through a water passage chamber, a deep region and a suction chamber installed at the bottom of the pond to remove foreign matter with a filter and is then passed through the suction pump and returned to the pond from an outlet. Since the system is not configured to utilize the natural purification system, however, the pond structure is complex and a high-horsepower suction pump must be used.

The system of JP-B-49-29517 effects physical filtering in a tank filter to remove solid particles (impurities), thereafter effects biochemical purification in a sedimentation tank, and then returns the purified water to the pond. This system also has to be large and complex because it does not utilize the purification system of the natural environment.

These pond water purification systems are further liable to allow alga cells and the like to stick to the bottom of the pond where they may rapidly proliferate when the environmental conditions become right. When this happens, the color of the pond water changes and algae may make the pond environment unsuitable for animal life.

SUMMARY OF THE INVENTION

An object of this invention is to provide a clean water system and a clean water system structure that overcome the foregoing problems.

Another object of the invention is to provide a clean water system and structure that positively utilize the natural water purification system present in rivers, the ocean and other natural water bodies, i.e., the remarkable natural mechanism capable of creating and maintaining a biological environment suitable for the development and sustenance of diverse life forms.

Another object of the invention is to provide such a system and a system structure capable of preventing water fouling and stench over the long term and enabling low-cost maintenance of ponds and the like.

For achieving these objects, a first aspect of the invention provides a clean water system for maintaining water in a water body such as a pond in a desired biological condition by causing water current producing means to produce a substantially horizontal water current of the water in the water body to enable a sand layer provided at the bottom of the water body to regulate the development of biological groups and produce a food-chain effect among the biological groups living in main region of the water body and near the bottom and surface of the water body.

The water current producing means, which is based on knowledge obtained by the applicant regarding the water purification system present in the natural environment of the ocean, rivers and the like, is for preventing water fouling by keeping the water in constant motion, because the supply of oxygen falls and water fouling occurs when the water becomes stagnant.

When the invention system is applied to a fouled river that has lost its water purification system, the "current" of the river can be utilized as the water current producing means and be incorporated as the water current producing means.

The sand layer serves as a culture medium for bacteria, algae and other living organisms. As it is readily agitated by the swimming activity of the fishes that are part of the food chain, the adherence of algae can be prevented to regulate growth of biological groups.

The food chain is peculiar to the particular set of biological groups gathering and living at each specific location or habitat. The links of the food chain established in a pond in a particular locality may, for example, consist of bacteria and the like as producers that consume fish excretions and secretions, aquatic insects etc. that feed on these organisms as primary consumers, and fishes and other swimmers that feed on the bugs etc. as secondary consumers.

By utilizing the natural power of nature's own purification system, the first aspect of the invention enables provision of a low-maintenance-cost clean water system that can prevent fouling and occurrence of stench over long periods not only of pond water but also of the water of pools, water storage tanks, streams, rivers and the like.

A second aspect of the invention provides a clean water system according to the first aspect characterized in that the water current producing means is supplied with purified water.

The purified water can, for example, be water passed through a tank filter or water exposed to ultraviolet rays. The supply of such purified water further enhances the water purification.

A third aspect of the invention provides a clean water system according to the first or second aspect characterized in that the food chain is a chain established in a pond.

Since this aspect of the invention utilizes the natural power of nature's own purification system, it enables provision of a low-maintenance-cost clean water system that can prevent fouling and occurrence of stench over long periods of garden ponds, ornamental ponds, and park and golf course ponds.

A fourth aspect of the invention achieves the foregoing objects by providing a clean water structure comprising water current producing means for producing a substantially horizontal water current in a body of water, a sand layer provided at the bottom of the water body, and biological groups that form a food chain in the main region of the water body and near the bottom and surface of the water body.

Like the first aspect of the invention, this aspect of the invention also utilizes the natural power of the natural environment's purification system to provide a clean water system structure that enables low-maintenance-cost prevention of fouling and occurrence of stench over long periods in the water of ponds, pools, water storage tanks, streams, rivers and the like.

A fifth aspect of the invention provides a clean water structure according to the fourth aspect characterized in being provided with water purification means.

The purification means can, for example, be a tank filter incorporated in the water current producing means or sterilization means utilizing ultraviolet rays incorporated in the tank filter. The supply of the purified water enhances the water purification.

A sixth aspect of the invention achieves the foregoing objects by providing a clean water structure characterized in comprising a bottom of a body of water formed with at least one level difference establishing a height differential, water circulation means for circulating water from a lower level of the bottom to a higher level thereof, a sand layer provided on the bottom formed with the level difference and biological groups that form a food-chain effect in the main region of the water body and near the bottom and surface of the water body.

In this aspect, the aforesaid water current producing means is replaced by a bottom formed with at least one level difference establishing a height differential and water circulation means for circulating water from a lower level of the bottom to a higher level thereof, whereby water movement is produced by the height differential, i.e., gravity.

Like the first and fourth aspects, this structure also utilizes the natural power of the natural environment's purification system to provide a clean water system structure that enables low-maintenance-cost prevention of fouling and occurrence of stench over long periods in the water of ponds, pools, water storage tanks, streams, rivers and the like.

A seventh aspect of the invention provides a clean water structure according to the fourth aspect characterized in being provided with water purification means.

Like the second and fifth aspects, this aspect also enhances the water purification.

An eight aspect of the invention provides a clean water structure according to the fourth or seventh aspect characterized in that the food chain is a chain established in a pond.

This aspect provides the same effect as that of the third aspect.

BEST MODE FOR CARRYING OUT THE INVENTION

A first embodiment of the invention will now be explained with reference to FIGS. 1 and 2.

An ornamental pond 1 is formed by laying concrete at the bottom 10 and on four sides 11, 12, . . . and partially filling the so-defined space with water.

Figure 1:
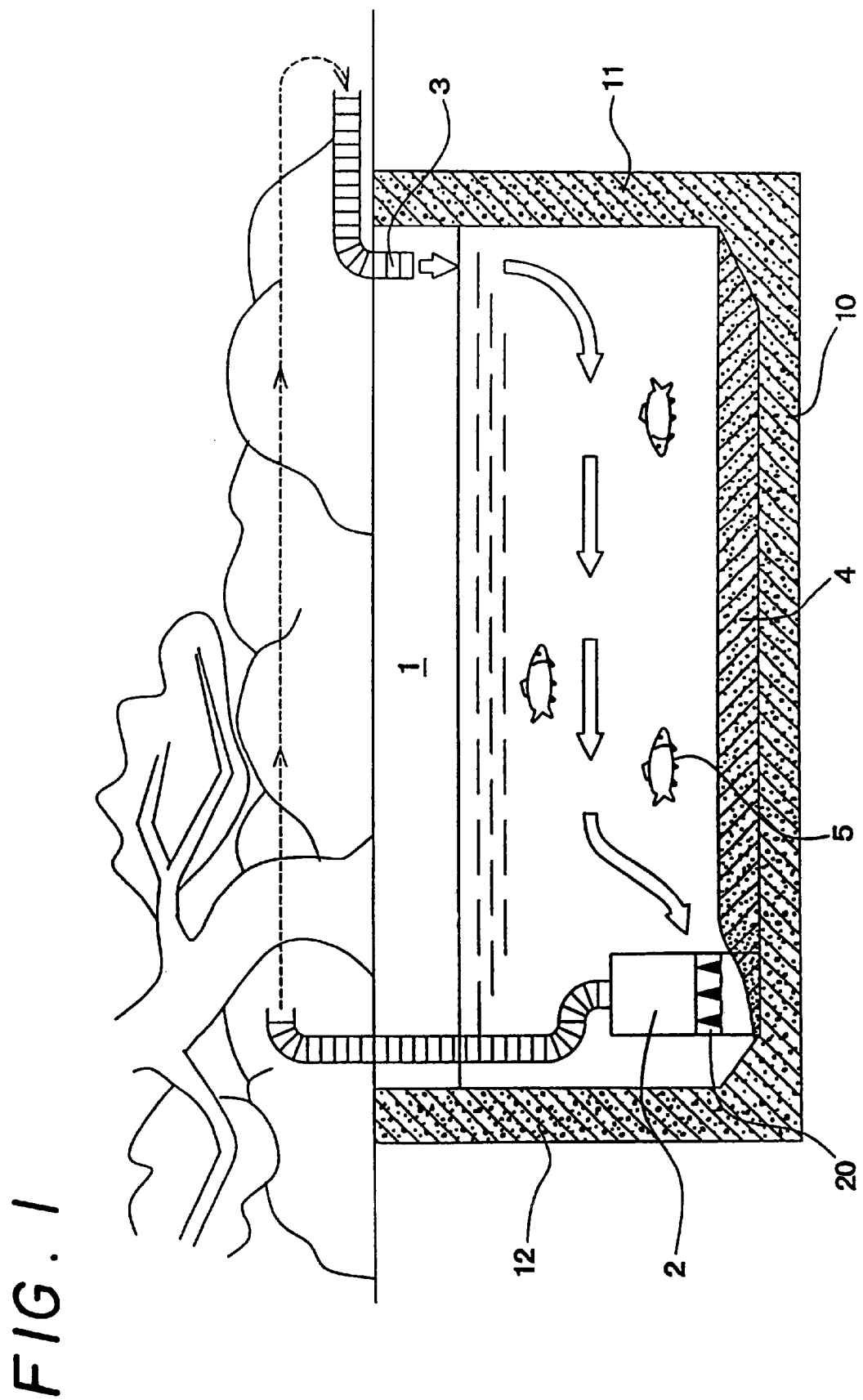
FIG. 1 is a sectional view of an ornamental pond that is a first embodiment of the invention.

As shown in FIG. 1, water current producing means is configured by an underwater pump 2 installed at one end of the pond 1 and an outlet 3 that discharges the water pumped by the underwater pump 2 at the other end of the pond. A sand layer 4 is spread to a prescribed depth on the bottom 10 and carp or other swimming fishes 5 are allowed to swim in the water as secondary consumers in the food chain.

The outlet 3 is disposed at a prescribed height above the water surface so that water falling from the outlet 3 can entrain air.

The depth of the sand layer 4 is not particularly limited but one of 10 to 15 cm or even less is sufficient. Although the sand layer 4 is preferably provided over the whole area of the bottom 10, no problem is caused by the presence of a portion or portions with no sand layer.

The sand particles preferably have a degree of granularity enabling them to resist movement with the water current.

A culture medium for proliferation of aerobic bacterial is formed at the surface of the sand layer 4 and a culture medium for proliferation of anaerobic bacteria is established deeper in the sand layer 4. These bacteria differing with depth into the sand layer 4 decompose the excretions and secretions of the carp or other swimming fishes 5 and the like in the water into nitrogen and water, thereby purifying the water of the pond 1.

The grain diameter of the sand of the sand layer 4 is preferably not greater than around 5 mm. This is to make the sand layer 4 easy to agitate by the swimming activity of the carp 5 or other such fishes so as to avoid colonization of the sand layer 4 by algae and the like, which may use it as a culture medium.

Figure 2:
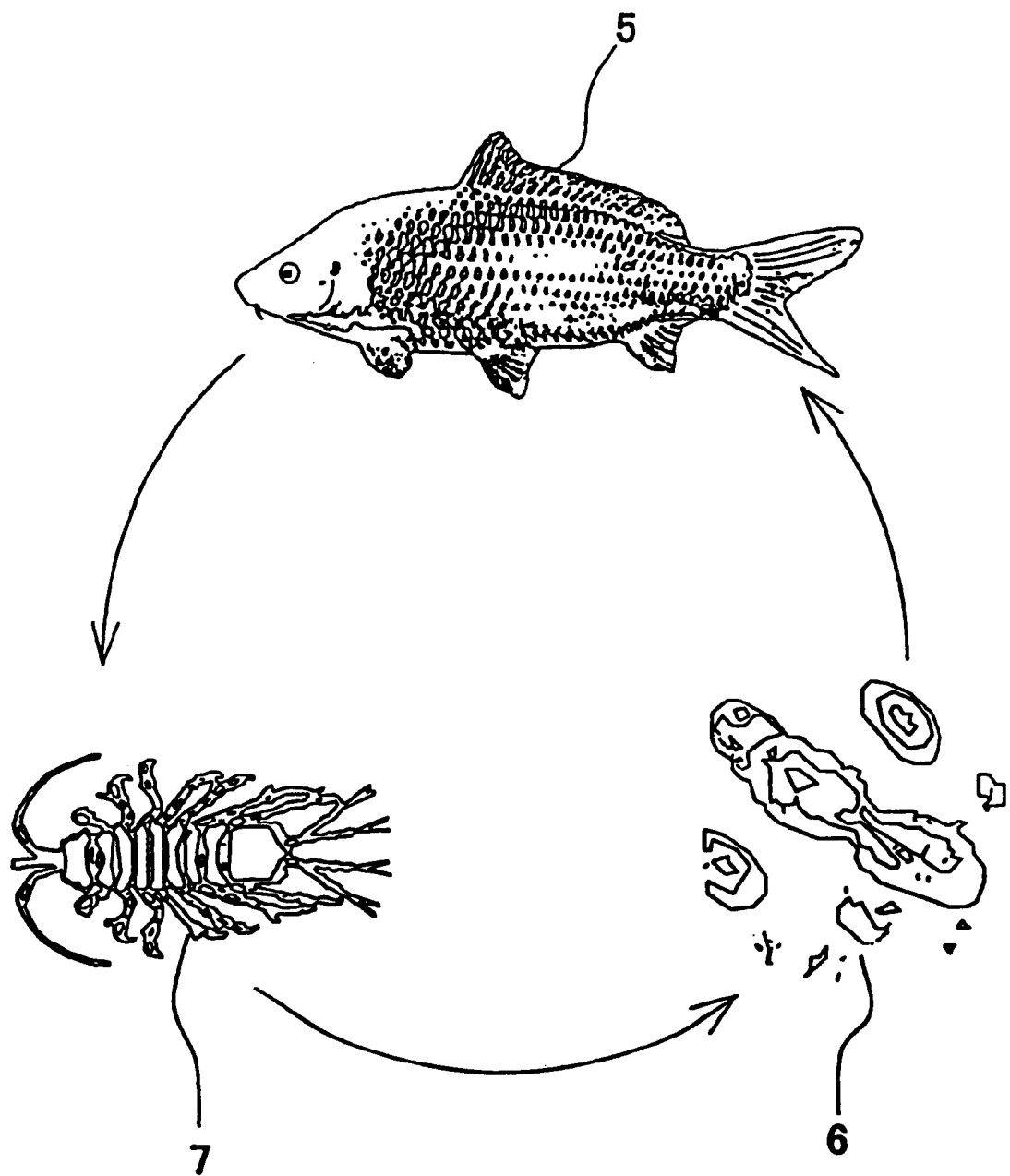
FIG. 2 is a diagram of a hypothetical food chain present in the pond of the first embodiment.

As shown in FIG. 2, the organisms forming the food chain in the ornamental pond 1 can be presumed to consist of bacteria 6 that consume the excretions and secretions of the swimming fishes 5, aquatic insects and the like, e.g., water boatmen 7, that feed on the bacteria 6, and the swimming fish 5, e.g. carp, that feed on the aquatic bugs 7.

The food chain is, however, not limited to that shown in FIG. 2 but is peculiar to the particular set of biological groups gathering and living at each specific location or habitat.

Namely, since this invention positively utilizes the remarkable mechanism whereby organisms adapt to the environment of their habitat and many and various organisms breed in their presence, it is necessary to presume various different food chains not only in ponds but also in water tanks, rivers, streams and the like.

In the ornamental pond 1 of the foregoing configuration the negative pressure produced at the inlet 20 of the underwater pump 2 sucks water into the inlet 20 to produce movement of water in the pond such as causes water immediately under the outlet 3 to migrate toward the inlet 20.

By this there is constituted a clean water system or a clean water maintenance method wherein water is kept in motion to constantly supply oxygen to the entire pond 1 and prevent stagnation, thereby creating an environment in which the food-chain effect can easily operate, and the water is purified by the food-chain phenomenon among the organisms living in the pond 1.

It is therefore possible to achieve low-maintenance-cost prevention of water fouling and stench over long periods without need for a high-horsepower pump.

Moreover, the swimming fish can be maintained in a healthy, disease-free condition. Further, the fishes, depending on their number, do not require any additional food supply so long as the food-chain effect continues to operate. The clean water system and structure are therefore optimum for an ornamental pond.

In addition, the fact that occurrence of algae and the like can be prevented also lowers maintenance costs and, moreover, reduces the danger that a person entering the pond for maintenance will slip on algae or the like or that a child entering the pond by mistake will drown.

Figure 3:
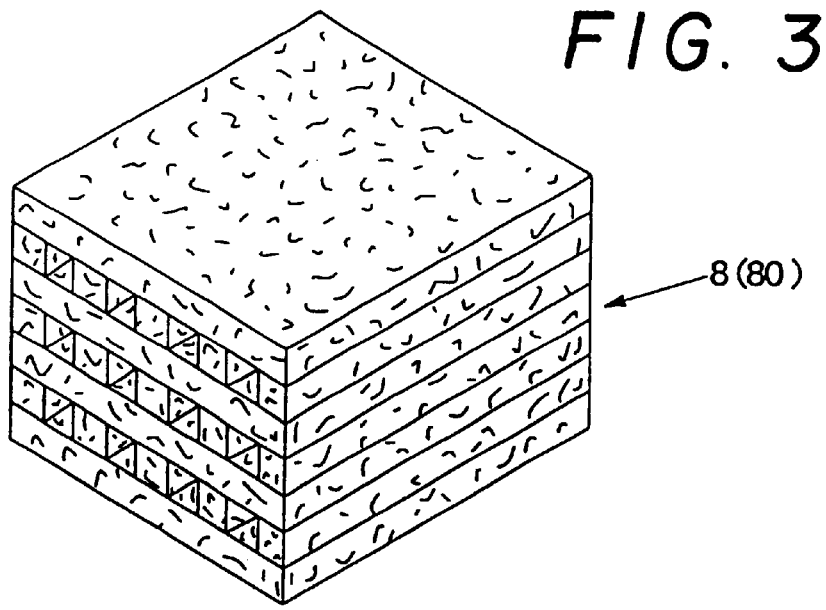
FIG. 3 is a perspective view of a filter material used in the pond of the first embodiment.

A tank filter 8 is preferably installed as purification means between the underwater pump 2 and the outlet 3 constituting the water current producing means. This tank filter can be constituted using a cartridge-type filter material 80 which, as shown in FIG. 3, is assembled of plate-like mats obtained by densely forming a polyester base material with small holes and cutting it to a prescribed size.

Since the filter material 80 of such a tank filter 8 becomes a culture medium for bacteria, water containing harmful substances is biochemically purified to further enhance the water purification.

Figure 4:
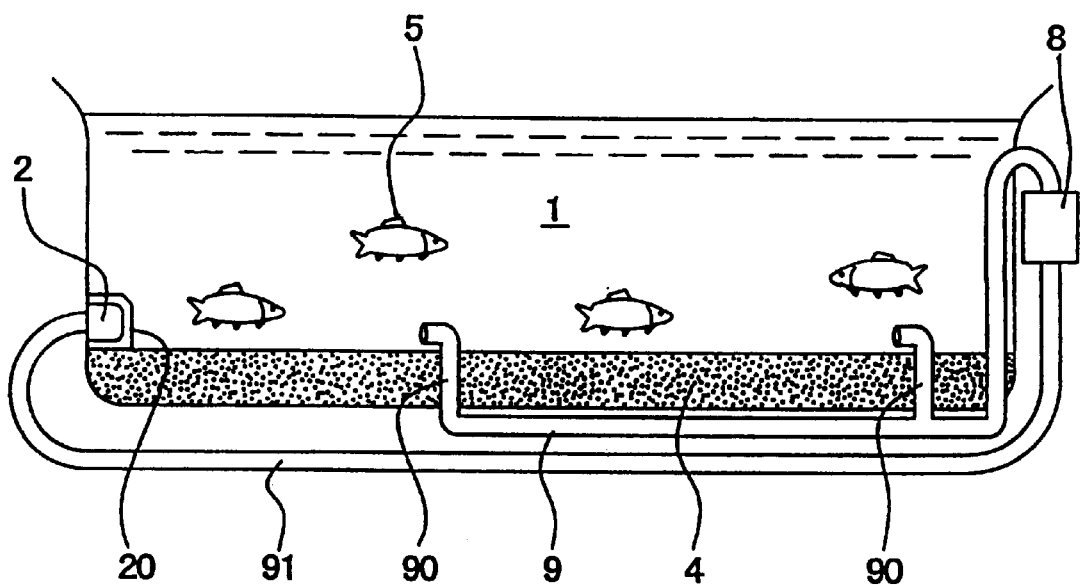
FIG. 4 is a sectional view of an ornamental pond that is a second embodiment of the invention.

A second embodiment of the invention will now be explained with reference to FIG. 4.

The difference between this embodiment and the first embodiment is that a pipe 9 is installed under the sand layer 4 and discharge pipes 90, 90 are provided at appropriate points of the pipe 9 to project upward from the sand layer 4.

The pipe 9 and the discharge pipes 90 constitute water current producing means for producing water movement. Each discharge pipe 90 is directed toward the inlet 20 of the underwater pump 2. Depending on the depth of the water, discharge pipes 90 can be provided in multiple tiers in the vertical direction. Such a configuration provides water current producing means matched to the water depth.

In the structure of the second embodiment, when water is discharged from the discharge pipes 90 toward the inlet 20, the water moves according to its direct advance property to reach the inlet 20 of the pump 2.

Then, upon being sucked in by the pump 2, it passes through a pipe 91 and the tank filter 8 to be once again discharged from the discharge pipes 90 of the pipe 9.

Since other aspects of the configuration are identical with those of the first embodiment, it achieves the same effects as the first embodiment while having the further advantage that the discharge pipes are appropriately arrayed to keep the water moving without stagnation at all locations in the water of the pond 1.

Figure 5:
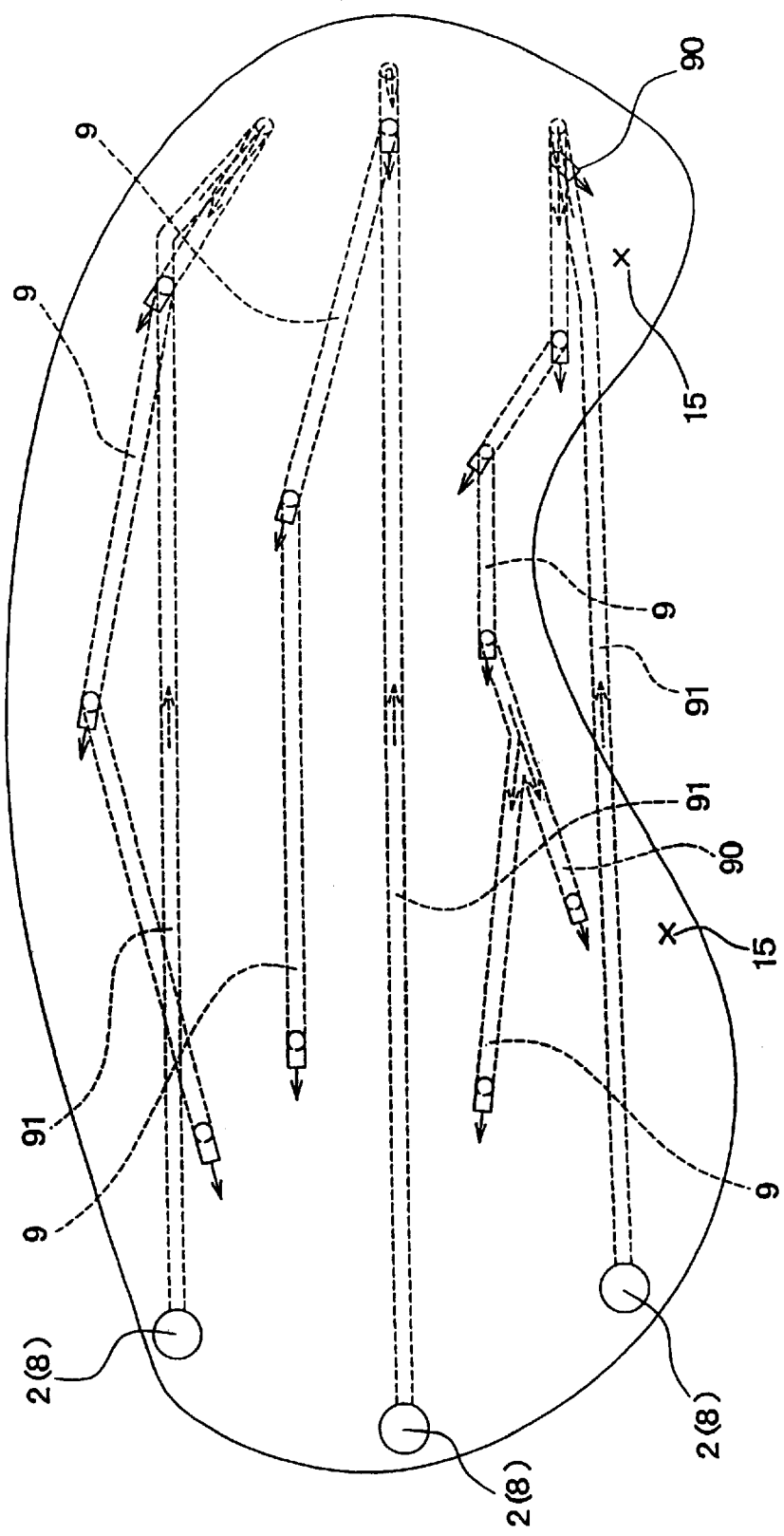
FIG. 5 is a plan view of the ornamental pond of the second embodiment.

Even in the case of a large pond that covers as much as 1,500 m² and, as shown in FIG. 5, includes spots that prevent direct advance of the water (15, 15), the arraying of the discharge pipes 90, 90 enables water purification using pumps of only about three horsepower in total.

Figure 6:
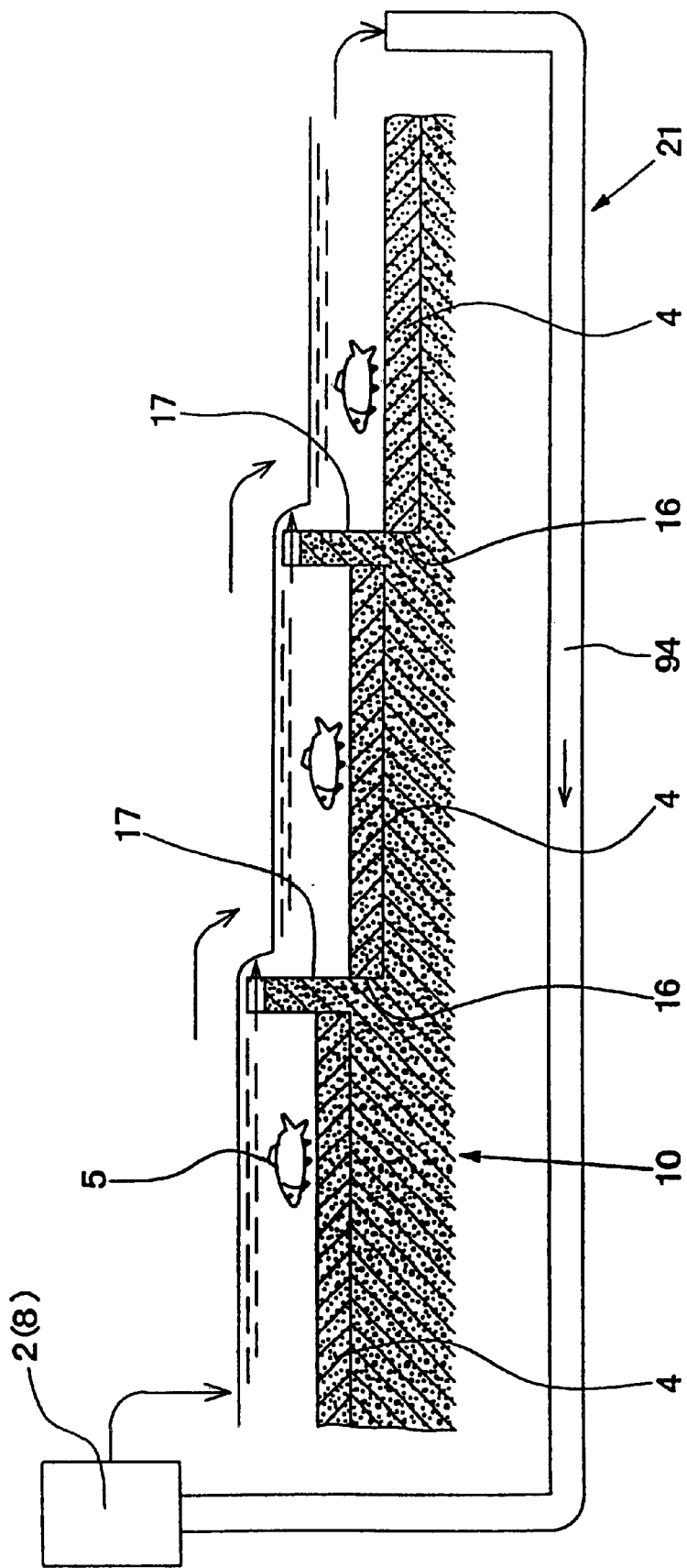
FIG. 6 is a sectional view of an ornamental pond that is a third embodiment of the invention.

A third embodiment of the invention will now be explained with reference to FIG. 6.

The difference between this embodiment and the first embodiment is that the water current producing means is changed to one constituted of water circulation means 21 for circulating water from a low level to a high level and a bottom 10 provided with level differences 16, 16 . . . that establish a height differential.

The water circulation means 21 consists of a pump 2 disposed at a high level, a tank filter 8 and pipe 94 for delivering water from a low level to the pump 2.

A sand weir 17 is preferably provided at each level difference 16, 16 . . . to prevent the sand of the sand layer 4 from being carried away.

In this third embodiment, a water current is produced as the water falls from a higher level to a lower level owing to the effect of the level differences 16, 16 . . . , i.e., the effect of gravity.

Since other aspects of the configuration are identical with those of the first embodiment, it achieves the same effects as the first embodiment.

Figure 7:
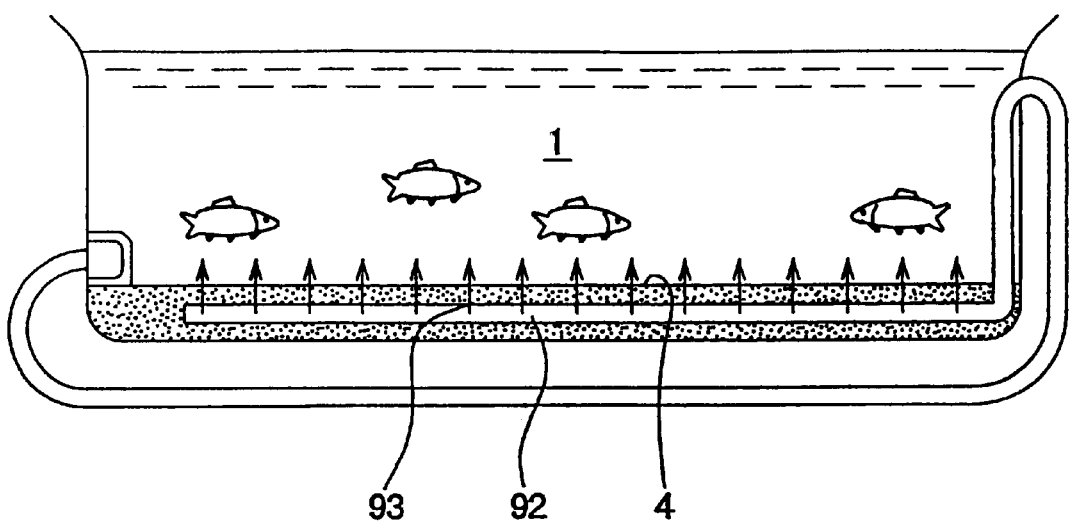
FIG. 7 is a sectional view of another example of an ornamental pond.

In any of the foregoing embodiments, a perforated pipe 92 can be installed as shown in FIG. 7 as means for agitating the sand layer 4.

By discharging air through air holes 93 with this arrangement, the sand layer 4 can be periodically agitated throughout and the sand can be made to appear as if roiling in the manner of a natural spring.

Moreover, when the water is deep and none of the aforesaid water current producing means can move the water at deep levels, the air from the air holes 93 moves the water by producing convection currents.

Although the foregoing embodiments require the amounts of water lost by evaporation and leakage to be appropriately replenished, these amounts are small. In this regard also, therefore, the clean water system and structure enable low-cost maintenance.

What is claimed is:

1. A manmade clean water structure containing a body of water characterized in comprising:

water circulation means for circulating water from the lower level of the bottom surface to the higher level thereof and comprising pumping means in combination with at least one conduit for causing said water circulation by drawing water from said lower level and discharging water to said higher level, biological groups that form a food-chain in the main region of the water body and near a bottom and a top of the water body, a sand layer provided on the bottom surface, said sand layer being readily agitated by swimming activities of fish that are part of said food-chain.

2. A clean water structure according to claim 1, characterized in being provided with water purification means.

3. A clean water structure according to claim 2, characterized in that the food chain is a chain established in a pond.

4. A clean water structure according to claim 1, characterized in that the food chain is a chain established in a pond.

5. A clean water structure according to claim 1, wherein said sand layer is of sufficient depth on said bottom surface to serve as a culture medium for bacteria and other living organisms.

6. A clean water structure according to claim 5, wherein said culture medium comprises aerobic bacteria formed at the surface of said sand layer and an anaerobic bacteria established deeper in said sand layer.

7. A clean water structure according to claim 1, wherein said agitation means comprises a perforated pipe for discharging air through at least a portion of said sand layer.

8. A clean water structure according to claim 1, wherein the grain diameter of sand in said sand layer is not greater than about 5 mm.

9. A clean water structure according to claim 1, wherein said water circulation means produces a substantially horizontal water current.

10. A clean water structure according to claim 1, wherein said water circulation means comprises a pump having an inlet for receiving a portion of said water, and discharge means for directing at least a portion of pumped water toward said pump inlet.

11. A manmade clean water system for maintaining a desired biological condition in an artificial water body contained in a structure constructed with a bottom surface and at least one side surface, said clean water system comprising:

water current producing means for producing water currents keeping the water in constant motion to prevent its stagnation;

biological groups living in the water body for producing a food-chain capable of creating and maintaining a biological environment suitable for the development and sustenance of diverse lifeforms;

a sand layer of sufficient depth on said bottom surface to serve as a culture medium for bacteria and other living organisms; and agitation means for agitating said sand layer to regulate development of said biological groups and purification of said water;

said bottom surface being constructed with at least one level difference establishing a a height differential between a lower level and a higher level, and said current producing means comprising pumping means in combination with at least on conduit for drawing water from said lower level of the bottom surface and discharging water to said higher level thereof.

12. A clean water system according to claim 11, wherein said agitation means comprises swimming activities of fish that are part of said biological groups.

13. A clean water system according to claim 11, wherein said agitation means comprises a perforated pipe for discharging air through at least a portion of said sand layer.

14. A clean water system according to claim 11, wherein said culture medium comprises aerobic bacteria formed at the surface of said sand layer and anaerobic bacteria established deeper in said sand layer.

15. A clean water system according to claim 11, wherein the grain diameter of sand in said sand layer is not greater than about 5 mm.

16. A clean water system according to claim 11, wherein said current producing means produces a substantially horizontal water current.

17. A clean water system according to claim 11, wherein said current producing means comprises a pump having an inlet for receiving a portion of said water, and discharge means for directing at least a portion of said water currents toward said pump inlet.

* * * * *